Jan. 2, 1951  V. SIMMONS ET AL  2,536,577
ELECTRICAL TESTING IMPLEMENT
Filed April 23, 1947
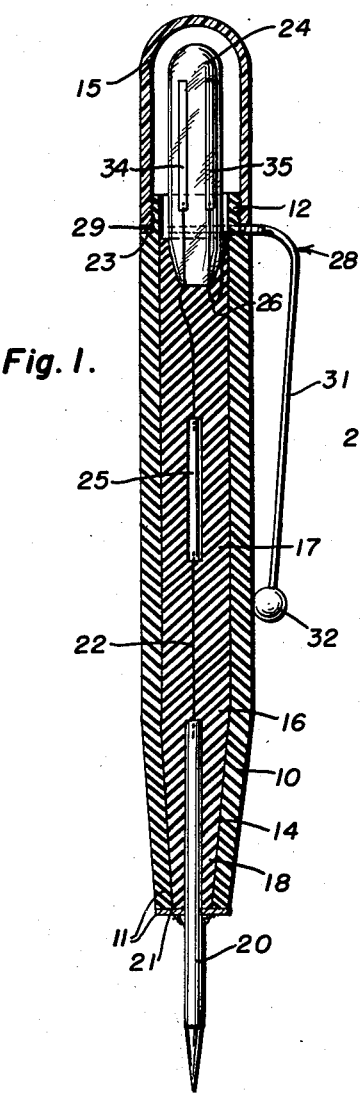
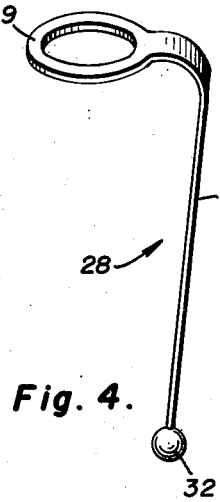
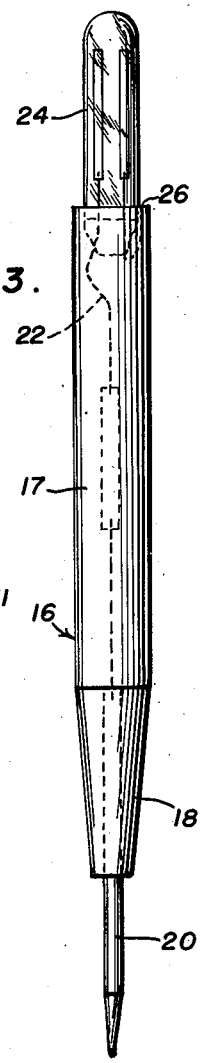
Fig. 1.
Fig. 3.
Fig. 4.
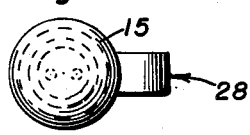
Fig. 2.
*Inventor*
Verlie Simmons
Berdice L. Hutchinson
By *Clarence A. O'Brien and Harvey B. Jacobson*
Attorneys Patented Jan. 2, 1951

2,536,577

UNITED STATES PATENT OFFICE 2,536,577

ELECTRICAL TESTING IMPLEMENT

Verlie Simmons, Hazel Park, and Berdice L. Hutchison, Royal Oak, Mich.

Application April 23, 1947, Serial No. 743,406

1 Claim. (Cl. 175—183)

This invention relates to testing implements for detecting the presence of a voltage or of a potential difference above a certain limit and it has for its object to provide a very small and handy pocket tester shaped and carried in the style of a pencil or fountain pen, which permits to obtain indications while held in the hand and may be used for voltages larger than 50 volts up to several hundred volts, these limits including the voltages in use for the conventional power supply networks which are 110-115 volts and 220-250 volts.

A further object of the invention consists in providing a testing implement of the type mentioned which presents a smooth uninterrupted outer surface.

A further object of the invention consists in making the implement in two parts, one forming the core and containing practically all the members necessary for testing, the other forming a mere shell carrying merely a clip which serves to hold the implement when carried in a pocket and which also forms the ground connection when held by the operator.

Further objects will be apparent from the following detailed specification describing and illustrating the invention by way of example. It is to be understood, however, that the example as illustrated has been selected in order to base on it the explanation of the principle of the invention, but it does not incorporate the modifications to which the embodiment of the invention may be subjected. Modifications are therefore not necessarily to be considered as departures from the invention.

In the accompanying drawing:

Figure 1 is an elevational sectional view of the testing implement;

Figure 2 is a top view thereof;

Figure 3 is an elevational view of the central body or core;

Figure 4 is a perspective view of a detail.

The testing implement comprises an elongated outer shell or casing 10 preferably of insulating material provided with a tapering conical end 11 and with a screw threaded stepped portion or neck 12 of a smaller diameter than the shell or casing itself on which a screw threaded cap 15 of translucent or transparent material may be fixed so that it is flush with the casing. Through this cap access may be had to the hollow interior of the casing which is preferably cylindrical, with a tapering conical portion 14 near the conical end of the casing. Into this casing a cylindrical body or core 16 of insulating material may be inserted, which carries the testing elements. The said body preferably fits snugly into the hollow interior of the casing 10 and is therefore provided with a cylindrical portion 17 and a tapering or conical portion 18.

Centrally held within said body or core 16 is a test needle or pin 20 which projects outwardly to the desired extent. A washer or disk 21 may be slipped over the needle or pin 20 and soldered to the same after insertion of the core or body 16 into the casing or shell 10 in order to fix the said body permanently within the casing after mounting.

A high ohmic resistor 25 of the so-called silite type connected with the testing needle or pin by means of a wire 22 may be embedded within the body 16. The upper end portion of said body carries a small neon lamp 24, the socket of which may be embedded into the body 10, while the remainder of the lamp projects outwardly. One of the electrodes 34 of said lamp is connected with the resistance 25 while the other electrode 35 is connected with a wire 26 which presses the neck portion 12 and leads to the shoulder 23 below the neck portion 12 of the shell or casing. The end of the wire may be fixed on the shoulder by means of a drop of solder.

On said shoulder 23 formed between the neck and the casing a metal clip 28 rests by means of its annular portion 29 which is slipped over the neck portion 12 and which is held between the shoulder 23 and the cap 15 screwed on said neck. Said clip moreover comprises the customary shank 31 and ball 32 serving to fix the tester in the pocket. The clip fulfills however the further purpose of forming a ground conductor for the neon lamp as the annular portion 29 of the clip 28 rests on the end of wire 26 and is therefore electrically connected with lamp electrode 35.

The core or body may be of plastic material or of hard rubber which is molded around the aforesaid parts such as the testing pin, the socket of the neon lamp, the resistor, the wire, etc. but it may also consist of two perfectly fitting separable halves which are provided with cavities for these elements and which when fitted together are held within the cavity of the casing 10.

It is also possible to fix the test pin and lamp socket merely in plugs closing the end portions of the hollow casing. The other elements such as the resistor and the wire are then simply located in the hollow interior and support themselves as they are stretched between the fixedly inserted plugs.

To use the instrument the operator places the testing needle or pin 20 on the point the voltage of which is to be tested and either grounds the clip or grips it firmly with his hand. If the voltage is sufficiently high and a potential difference of say 90 to 100 volts exists between the point tested and either the ground or the grounded capacity of the body of the operator holding the testing implement, then the neon lamp will light up. The lighting up of the neon lamp is visible on account of the transparency of the cap 15. The current flowing through the lamp is small, however on account of the resistor, the resistance of the neon lamp and the resistance of the human body and therefore the current cannot be felt by the operator and cannot cause any harm, even if the potential difference should be several hundred volts.

It will therefore be seen that the testing implement provides a very simple means to detect the presence of a potential difference between two points or between one point and ground.

Minor changes of the construction will not affect the invention, as will be clear to the expert skilled in the art.

We claim:

A pocket instrument forming a testing implement for indicating potentials or electric currents, comprising an elongated cylindrical casing with a hollow interior formed by a cylindrical bore tapering towards one end, and with a screw-threaded stepped end portion at the other end forming a collar and a seat, the former provided with a passage, an insulating cylindrical body with a conical end portion, fitting into said cylindrical bore and tapered end, a testing needle embedded within and partly projecting from one end of said cylindrical body, a resistor embedded within said cylindrical body, a neon lamp partly embedded within said insulating cylindrical body provided with electrodes, partly projecting on the other end of the cylindrical body, wires embedded within said body for connecting said needle, said resistor, and one electrode of the neon lamp, said insulating body thus forming a single unit holding all the active parts of the instrument, a translucent hollow cap, screwed on to the stepped end portion of the casing and surrounding projecting portion of the neon lamp, a metallic wire connection with the other electrode of the neon lamp projecting partly from said body, the projecting portion being led through the passage in the collar of the stepped portion of the casing to the seat portion, and a metal clip provided with an annular portion held between said cap and said casing on the stepped portion in operative connection with the wire leading to the second electrode of said neon lamp.

VERLIE SIMMONS.
BERDICE L. HUTCHISON.

REFERENCES CITED

The following references are of record in the file of this patent:

UNITED STATES PATENTS

| Number | Name | Date |
|---|---|---|
| 1,957,802 | Rabezzana | May 8, 1934 |
| 2,001,382 | Faltico | May 14, 1935 |
| 2,116,448 | O'Brein et al. | May 3, 1938 |
| 2,213,973 | Woodring | Sept. 10, 1940 |
| 2,366,991 | Wich | Jan. 9, 1945 |
| 2,413,484 | Berger | Dec. 31, 1946 |
| 2,458,628 | Okun | Jan. 11, 1949 |